United States Patent
Okada et al.

(10) Patent No.: US 7,895,732 B2
(45) Date of Patent: Mar. 1, 2011

(54) METHOD FOR MANUFACTURING A PERPENDICULAR MAGNETIC RECORDING HEAD

(75) Inventors: Tomohiro Okada, Kanagawa (JP); Isao Nunokawa, Kanagawa (JP); Kimitoshi Etoh, Kanagawa (JP); Kikuo Kusukawa, Saitama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 847 days.

(21) Appl. No.: 11/724,952

(22) Filed: Mar. 15, 2007

(65) Prior Publication Data

US 2007/0217069 A1    Sep. 20, 2007

(30) Foreign Application Priority Data

Mar. 15, 2006    (JP) .................................. 2006-071135

(51) Int. Cl.
*G11B 5/127* (2006.01)
*H04R 31/00* (2006.01)

(52) U.S. Cl. ................. 29/603.16; 29/603.07; 29/603.13; 29/603.14; 29/603.15; 29/603.18; 216/62; 216/65; 216/66; 360/121; 360/122; 360/317; 451/5; 451/41

(58) Field of Classification Search ............... 29/603.07, 29/603.13–603.16, 603.18; 360/121, 122, 360/317; 451/5, 41; 216/62, 65, 66
See application file for complete search history.

(56) References Cited

U.S. PATENT DOCUMENTS

| | | | |
|---|---|---|---|
| 6,258,283 B1 | 7/2001 | Mikami et al. | |
| 6,641,747 B1 * | 11/2003 | Lukanc et al. | 216/61 |
| 6,787,369 B2 * | 9/2004 | Ishii et al. | 438/3 |
| 2002/0023338 A1 | 2/2002 | Seigler et al. | |
| 2002/0176214 A1 | 11/2002 | Shukh et al. | |
| 2003/0085198 A1 * | 5/2003 | Yi et al. | 216/60 |
| 2003/0231426 A1 | 12/2003 | Sato | |
| 2004/0020894 A1 | 2/2004 | Williams et al. | |
| 2004/0218312 A1 | 11/2004 | Matono | |
| 2005/0068665 A1 | 3/2005 | Le et al. | |

(Continued)

FOREIGN PATENT DOCUMENTS

JP    2000-092929    4/2000

(Continued)

OTHER PUBLICATIONS

Liu et al., "Design and Characterization of Advanced Perpendicular Magnetic Recording Head," The Magnetic Recording Conference (TMRC) 2003, p. E6.

(Continued)

*Primary Examiner* — Paul D Kim
(74) *Attorney, Agent, or Firm* — GMG Intellectual Property Law; Guadalupe M. Garcia

(57) ABSTRACT

An embodiment of the present invention relates to a method of manufacturing a perpendicular magnetic recording having a main pole, return pole and trailing side shield disposed on the trailing side and the cross track direction side of said main pole. A process is described where the main pole has an etching layer in the upper part. The top and sides of the main pole having the etching signal layer in the upper part are covered with a nonmagnetic gap layer while leaving open a region forming the side shield. The nonmagnetic gap layer is then etched until a signal from the etching signal layer is detected by an etching signal detector. The trailing side shield on the top and sides of the nonmagnetic gap layer are then formed after the etching is halted.

10 Claims, 15 Drawing Sheets

U.S. PATENT DOCUMENTS

| | | |
|---|---|---|
| 2005/0068669 A1 | 3/2005 | Hsu et al. |
| 2005/0177996 A1 | 8/2005 | Yang et al. |
| 2006/0023352 A1 | 2/2006 | Le et al. |
| 2007/0258167 A1* | 11/2007 | Allen et al. .................. 360/126 |

FOREIGN PATENT DOCUMENTS

| | | |
|---|---|---|
| JP | 2003-132509 | 5/2003 |
| JP | 2005-190518 | 7/2005 |
| JP | 2005-285193 | 10/2005 |

OTHER PUBLICATIONS

European Search Report dated Feb. 2, 2008 for European patent application EP07250350.

Office Action for CN Application No. 200710086276.6, dated Aug. 15, 2008, 8 pages total.

* cited by examiner

METHOD FOR MANUFACTURING A PERPENDICULAR MAGNETIC RECORDING HEAD

CROSS-REFERENCE TO RELATED APPLICATION

The instant nonprovisional patent application claims priority to Japanese Patent Application 2006-071135, filed Mar. 15, 2006 and incorporated by reference in its entirety herein for all purposes.

BACKGROUND OF THE INVENTION

In a hard disk drive, data on a disk is read and written by a magnetic head. To increase the recording capacity per unit area of a magnetic disk, the areal density must be increased. However, in the current longitudinal magnetic recording systems, if the recorded bit length is reduced, the areal density cannot be increased because of thermal fluctuation of the magnetization of the medium. One approach to solving this problem is the perpendicular magnetic recording method which records a magnetization signal in the direction perpendicular to the medium. In the perpendicular magnetic recording method, a giant magneto-resistive (GMR) head, and a tunneling magneto-resistive (TMR) head whose read output is large or a current perpendicular to the plane (CPP) type GMR head, are used for reading. A single pole head is used for writing.

In perpendicular magnetic recording, to increase areal density, the track density and linear recording density must be increased. To increase linear recording density, the magnetic field gradient of a recording head must be improved. For this purpose, the recording medium is divided into two layers with a soft under layer (SUL) as the lower layer. However, to increase a higher recording density exceeding 200 Gb/in$^2$, a further improvement of magnetic field gradient from the recording head is required. In order to improve this magnetic field gradient, a trailing shield is effective, but the gap length on the trailing side must be precisely controlled. Also, to increase the track density, the track width of the head must be processed finer and more precise, but as the track becomes narrower, the effective track width written on the medium becomes significantly larger than the physical track width, so the narrowing track width had formed a greatest bottleneck to obtain track density increase. To solve this problem, for example, in US2002/0176214A1 or the point No. E6 of The Magnetic Recording Conference (TMRC) 2003, an example of a perpendicular magnetic recording head provided with a side shield, is disclosed. Also, in JP 2000-92929 A, a head provided with a trailing side shield and its manufacturing method are disclosed.

BRIEF SUMMARY OF THE INVENTION

Embodiments in accordance with the present invention provide a trailing side shield around a main pole and control the gap length on its trailing side to high accuracy so as to increase a recording magnetic field gradient. An etching signal layer is provided on a main pole, and the gap length on the trailing side of the main pole is controlled to high accuracy by stopping ion milling when a signal from this layer is detected.

For a more complete understanding of the present invention, reference is made to the following detailed description taken in conjunction with the accompanying drawings.

BRIEF DESCRIPTION OF THE DRAWINGS

FIG. 11 is a schematic cross-sectional view showing a method of manufacturing a magnetic head according to still another embodiment of the present invention.

FIG. 12 is a schematic view of an air bearing surface shape showing a write head according to an embodiment of the present invention.

DETAILED DESCRIPTION OF THE INVENTION

Figure 1:
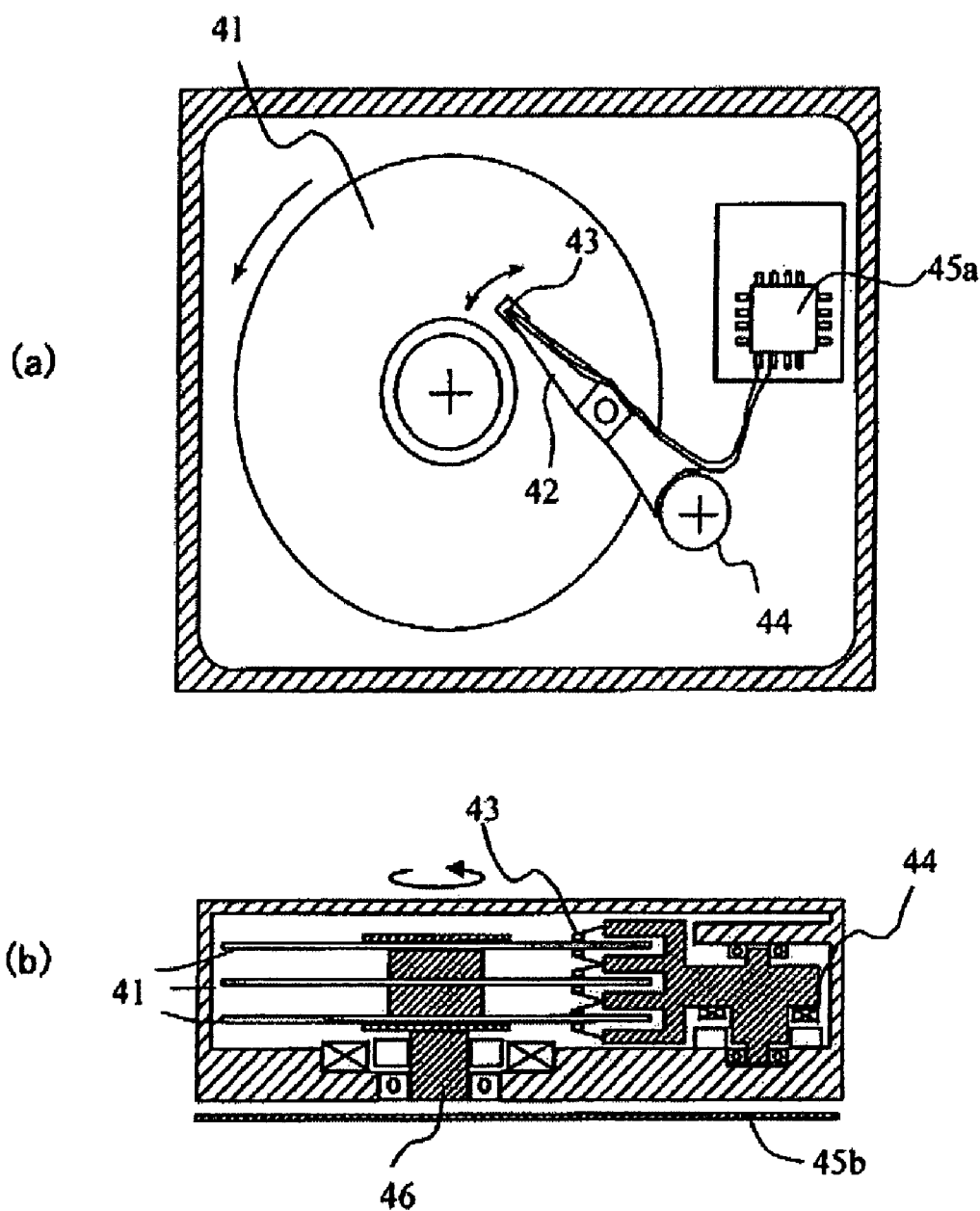
FIG. 1 is a general view of a magnetic read/write device.

Embodiments in accordance with the present invention relate to a perpendicular magnetic recording head used for reading from/writing to a perpendicular magnetic recording medium.

It is an object of an embodiment of the present invention to provide a perpendicular magnetic head with improved recording magnetic field gradient while suppressing write spread of the effective track width written on the medium, and to a method of manufacturing the same.

The perpendicular magnetic recording head according to an embodiment of the present invention has a trailing shield disposed on the trailing side of the main pole, or a trailing side shield disposed on the trailing side and track width direction side of the main pole, and is formed by laminating a nonmagnetic gap layer, an etching signal layer and an adhesion layer of a plating seed layer sequentially at the trailing side of the main pole, and forming a trailing shield or trailing side shield thereupon.

During manufacture, the etching signal layer is laminated on the trailing edge of the main pole, the surroundings of the main pole are covered by the nonmagnetic gap layer, the nonmagnetic gap layer is etched until a signal due to the etching of the etching signal layer is detected by an etching signal detector, the etching signal layer is then removed as required, and the trailing shield or trailing side shield is formed thereupon. Using ion milling for the etching of the nonmagnetic gap layer, the incident angle of the ions may be, for example, approximately 45° to approximately 65°. The etching signal layer includes a nonmagnetic material containing for example Ta, Cr, Mo, W, Nb, Rh or Si, and the nonmagnetic gap layer includes a material containing alumina. The plating seed layer contains Au. The photoresist is exposed using a KrF excimer laser since high accuracy is required. At this time, the Au has the effect of reducing halation because the Au has low reflectivity with respect to the KrF excimer laser.

According to an embodiment of the present invention, the gap length on the trailing side of the trailing shield or trailing side shield of the perpendicular magnetic recording medium can be controlled to high accuracy, so magnetization information can be recorded at a high recording density on the magnetic recording medium.

Hereafter, an embodiment of the present invention will be described referring to the drawings. In the following drawings, identical reference numerals are assigned to identical functional parts.

FIG. 1 is a schematic view of a hard disk drive. The hard disk drive performs read/write of a magnetization signal by a magnetic head mounted on a slider 43 fixed to the end of a suspension arm 42 at a predetermined position on a magnetic disk (magnetic recording medium) 41 which is rotated by a motor 46. A position (track) in the radial direction of the magnetic disk of the magnetic head can be selected by driving a rotary actuator 44. The swing of the arm 42 produces a skew angle when the magnetic head moves over the surface of the magnetic disk 41. The range of the skew angle is about ±15°. The write signal to the magnetic head and the read signal from the magnetic head are processed by signal processing circuits 45a, 45b.

Figure 2:
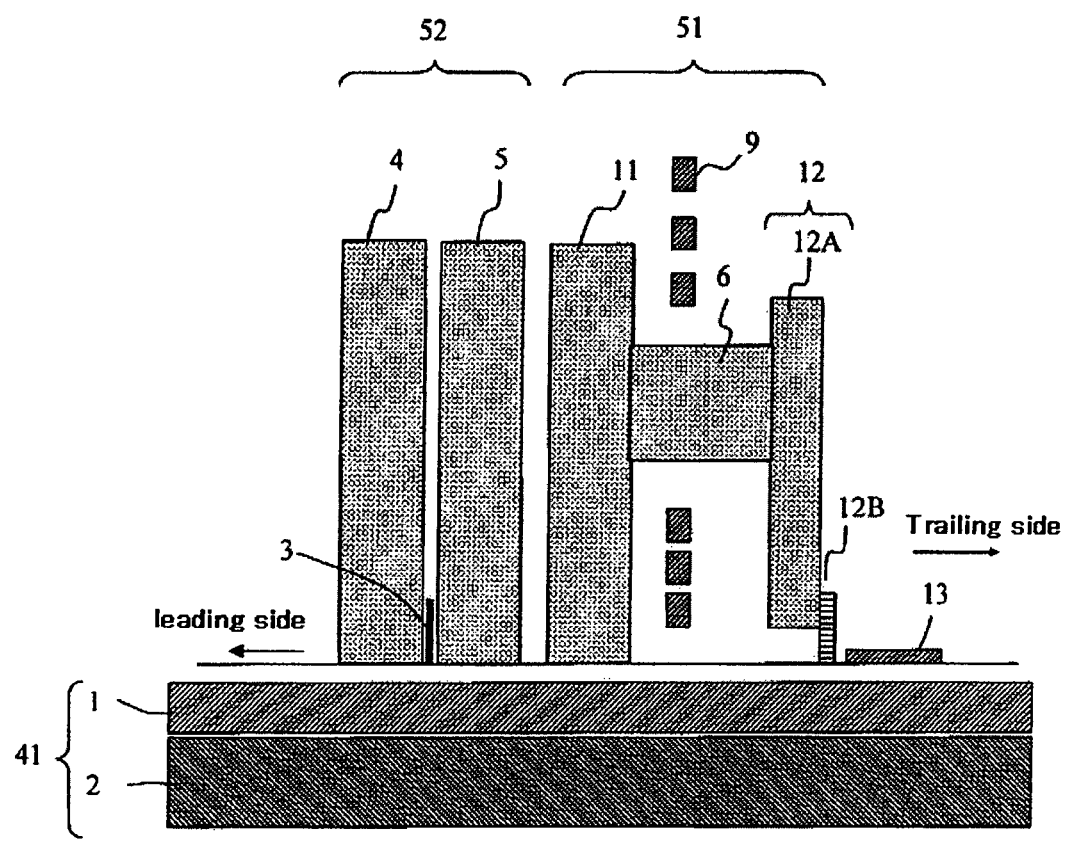
FIG. 2 is a schematic cross-sectional view through the track center of the magnetic head according to an embodiment of the present invention.

FIG. 2 is a cross-sectional schematic view through the center of a track in one example of a magnetic head according to the invention. This magnetic head is a read/write composite head having a recording head (single pole head) 51 including a main pole 12 and a return pole 11, and a read head 52 including a read sensor 3. The read sensor 3 including a giant magneto-resistive (GMR) element or a tunneling magneto-resistive (TMR) element is disposed between a pair of magnetic shields (read shields) consisting of a lower shield 4 on the leading side and an upper shield 5 on the trailing side. The main pole 12 and return pole 11 are magnetically connected by a pillar 6 at a position distant from the air bearing surface, thin film coils 9 being linked to the magnetic circuit formed by the main pole 12, the return pole 11 and the pillar 6. The main pole 12 is disposed on the leading side of the return pole 11. The main pole 12 includes a main pole yoke part 12A connected to the return pole 11 by the pillar 6, and a pole chip 12B which is exposed to the air bearing surface of the head, and which specifies the track width. The magnetic field produced from the main pole 12 of the recording head 51, passes through the magnetic recording layer 1 and soft magnetic seed layer 2 of the magnetic recording medium 41 and enters the return pole 11 so as to form a magnetic circuit, and a magnetization pattern is thereby recorded on the magnetic recording layer 1. At this time, according to the relation with the disk rotation direction, the part which the main pole 12 separates last from a certain point on the magnetic disk, i.e., the shape of the upper surface (trailing side) and side surface of the main pole has a major effect on the shape of the magnetization pattern. By disposing a shield 13 on the trailing side, the magnetic field gradient can therefore be increased, and the linear recording density can be increased by reducing the transition width of recording bits.

To achieve a high recording density in perpendicular magnetic recording, the recording magnetic field gradient of the magnetic head and recording magnetic field distribution in the track width direction must be improved. To improve the recording magnetic field distribution in the track width direction, a side shield is effective, and to improve the magnetic field gradient, a trailing shield is effective. A trailing side shield which has both a trailing shield and a side shield can improve both the recording magnetic field gradient and recording magnetic field distribution in the track width direction. In particular, to improve the magnetic field gradient and mass-produce stable heads, the gap length (trailing gap) between the trailing edge of the main pole and trailing shield must be controlled to a high accuracy. This is because the trailing gap has a major influence on the magnitude of the magnetic field gradient.

Figure 3:
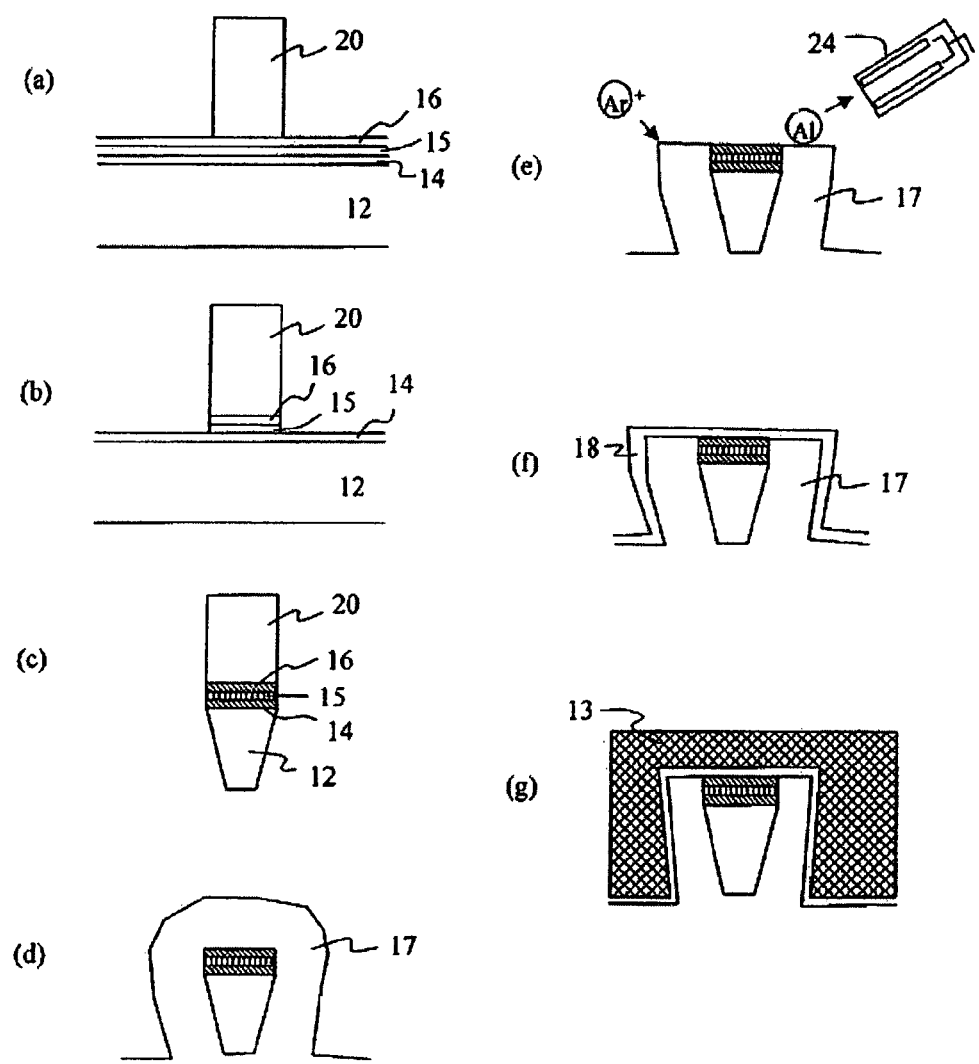
FIG. 3 is a schematic cross-sectional view showing a method of manufacturing the magnetic head according to an embodiment of the present invention.

FIG. 3 shows a cross-sectional schematic view of one embodiment of a method of manufacturing the magnetic head having a trailing side shield according to the present invention. Here, the method of manufacturing the main pole of the magnetic head, and the training side shield disposed on the trailing side and track width direction side of the main pole, will be described.

As shown in FIG. 3(a), a nonmagnetic gap layer 14, nonmagnetic etching mask layer 15, etching signal layer 16 and resist 20 are sequentially deposited on a magnetic layer 12 which will become the main pole, and the resist 20 is patterned according to the shape of the main pole. A material such as FeCo having a high saturation flux density Bs is used for the magnetic layer of the main pole. The nonmagnetic layer 14 is a layer for avoiding damage such as oxidation of the upper surface (trailing edge surface) of the main pole during the wafer process, and the reason why the nonmagnetic gap layer 14 is required is because, during perpendicular magnetic recording, the trailing edge of the main pole (upper surface of the main pole in the wafer process) has an important function in recording on the medium. Examples of a gap material which may be used are Cr, NiCr, Ta, Rh, Mo, Nb and Au. The nonmagnetic etching mask 15 formed on the gap layer may be omitted by increasing the film thickness of the nonmagnetic gap layer 14. Examples of the nonmagnetic etching mask 15 which may be used are a single layer film or laminated film of alumina, silica, titanium, titania, tantalum and tantalum oxide.

The etching signal layer 16 must be of a different material from that of the nonmagnetic gap layer 17 formed thereupon in the process (d) in FIG. 3 described later. For example, if alumina is used for the nonmagnetic gap layer, the material of the etching signal layer 16 to be used may be silicon, silica, tantalum, tantalum oxide, titanium, titania, NiCr, Cr, Rh, Mo, Nb or Au. Considering the ion milling rate, the etching single layer 16 preferably has a close ion milling rate to that of the nonmagnetic gap layer 17. For example, if alumina is used for the nonmagnetic gap layer, tantalum may be used as another material with a slow ion milling rate. Here, Ta was used for the etching signal layer 16.

Next, as shown in FIG. 3(b), the resist 20 is etched up to the etching signal layer 16 and nonmagnetic etching mask layer 15 by ion milling of the mask. Next, the nonmagnetic gap layer 14 and magnetic layer 12 of the main pole are etched using the resist mask 20, etching signal layer 16 and nonmagnetic etching mask layer 15 as a mask, and the main pole is processed to an inverted trapezium.

Next, the resist mask 20 is removed, and as shown in FIG. 3(d), the nonmagnetic gap layer 17 which will become part of the trailing gap and the side gap on the top and sides of the main pole, is formed. Examples of the material of the nonmagnetic gap layer are oxides such as alumina and silica, nitrides such as alumina nitride and silicon nitride, and nonmagnetic metals such as Cr, Ta, NiCr, Au and Cu. For the deposition, a carousel sputtering machine, ion beam deposition machine or chemical vapor deposition (CVD) machine is preferably used. This is because these deposition machines form a good film coating on the sides of the main pole, and are suitable for side shield gap-forming.

After forming the nonmagnetic gap layer 17, as shown in FIG. 3(e), the trailing side is planarized by etching with ion milling. The incident angle of the ion milling Ar+ ions is approximately 40° to approximately 65°. This is because when ions are incident within this range, the ions are incident on the trailing side and side of the nonmagnetic layer formed around the main pole, and the nonmagnetic layer is etched on both the trailing side and cross track side. End point detection of ion milling is performed by detecting a signal showing that the etching signal layer 16 has been etched with a detector 24, and ion milling stops when the signal from the etching signal layer 16 is detected. In the figure, as an example, the stage is shown where aluminum is etched. The detector 24 in this case is a mass analyzer. In the case of this example, milling is stopped when the mass analyzer detects Ta.

The detector which detects the signal from the etching single layer 16, in addition to a mass analyzer which directly detects ions produced by etching of the etching signal layer 16, may be an optical type of detector which detects a plasma light emitted from the etching signal layer. If the etching signal is detected by a mass analyzer, the etching signal layer 16 must have a different atomic mass to that of the surrounding nonmagnetic gap layer 17. When the plasma light is analyzed, the etching signal layer 16 must have a different light emission spectrum from that of the nonmagnetic gap layer 17.

Next, as shown in FIG. 3(f), a plating seed layer 18 is formed thereupon. The plating seed layer 18 may be a magnetic layer or a nonmagnetic layer. An example of a nonmagnetic plating seed layer is Au. If Au is used, NiCr, Cr, Ta or the like may be inserted as an adhesion layer. Examples of a magnetic plating seed layer are NiFeCo, CoFe and NiFe.

Next, as shown in FIG. 3(g), the trailing side shield 13 is formed by the plating with photoresist frame using the plating seed layer 18. Examples of the material of the trailing side shield 13 are FeNi, NiFe, CoNiFe and FeCo. If the trailing side shield 13 has the higher saturation flux density (Bs), the magnetic field gradient is steeper, so Bs is preferably high.

The upper surface of the main pole is the trailing edge of the head, and since it has an effect on the magnetization pattern when the magnetization pattern is recorded on the medium, it must be formed without damage. In the method disclosed in JP 2000-92929 A, the nonmagnetic layer around the upper surface of the main pole is planarized by CMP. In this method, the gap length between the upper surface (trailing edge) and the trailing shield of the main pole can be processed to high accuracy, but the upper surface of the main pole is subject to damage by CMP. To deal with this problem, in a method according to an embodiment of the present invention, because of the presence of the nonmagnetic gap layer on the trailing side of the magnetic layer of the main pole and the nonmagnetic layer which will become an etching mask, the upper surface of the main pole is not subject to damage. Also, since the etching signal layer is provided and the etching end point is detected, the gap length on the trailing side may be controlled to high accuracy.

According to this embodiment, a trailing gap length wherein the distance from the trailing edge of the magnetic layer to the trailing shield of the main pole (total film thickness of the nonmagnetic gap layer, nonmagnetic layer which will become the etching mask, etching signal layer and nonmagnetic plating seed layer) is 50 nm or less, can be formed with high reproducibility. This is because, since the gradient of the recording magnetic field is high, the trailing gap length is preferably arranged to be identical to or less than distance from the air bearing surface of the head to the soft under layer (SUL) of the medium.

Figure 4:
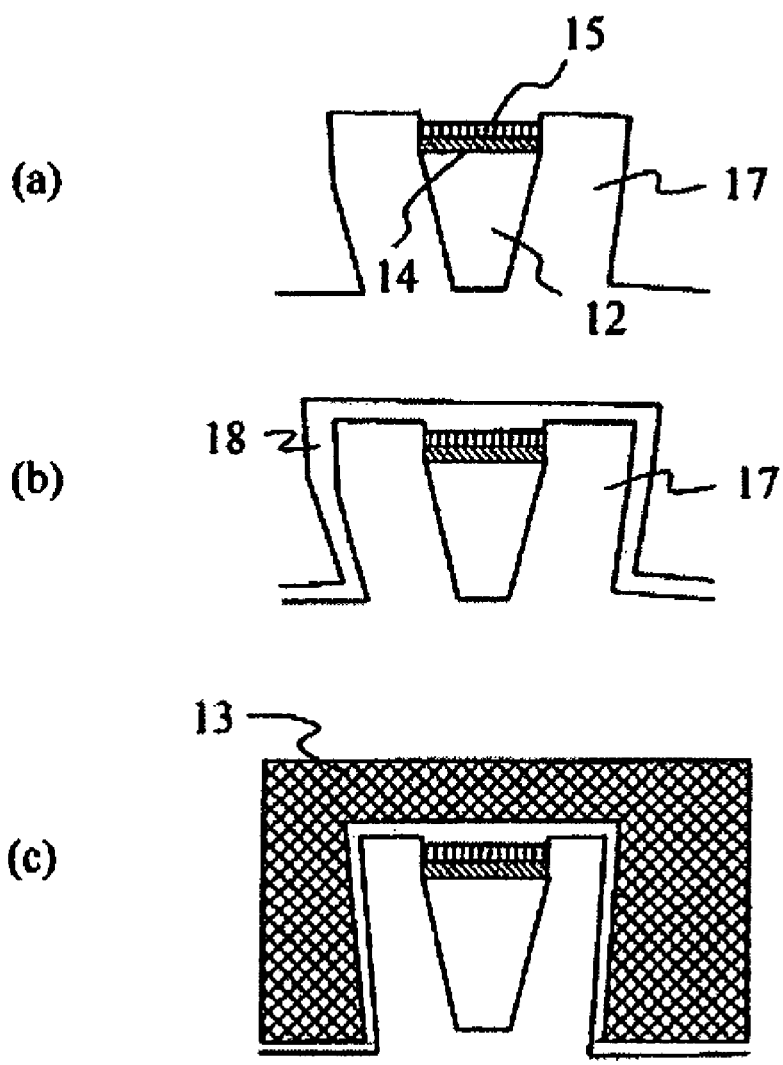
FIG. 4 is a schematic cross-sectional view showing one embodiment of a method of manufacturing the magnetic head according to the present invention.

FIG. 4 shows a cross-sectional view of another embodiment of a magnetic head manufacturing method having a trailing side shield according to the present invention. Here, only the processes different from those shown in FIG. 3 will be described. The process shown in FIG. 4(a) is a process following FIG. 3(e).

In this embodiment, as was described using FIG. 3(e), the nonmagnetic gap layer 17 is ion milled until a signal from the etching signal layer 16 is detected. Following this, as shown in FIG. 4(a), only the etching signal layer 16 is removed by reactive ion etching (RIE). For example, when the etching signal layer 16 is Si, $SiO_2$, Ta, or $Ta_2O_5$, RIE with $CF_4$ or $CHF_3$ may be used. If the nonmagnetic gap layer 17 is alumina, a selectivity ratio of 1000 or more is obtained.

Next, as shown in FIG. 4(b), the plating seed layer 18 is formed, and as shown in FIG. 4(c), the trailing side shield 13 is formed by the plating with photoresist frame using the plating seed layer 18. The material of the plating seed layer 18 and material of the trailing side shield 13 are identical to those of the embodiment shown in FIG. 3, and their description will not be repeated. According to this embodiment, since the etching signal layer 16 is removed, the trailing gap length can be made narrower, and a trailing gap length of approximately 20 nm can be realized with high accuracy.

Figure 5:
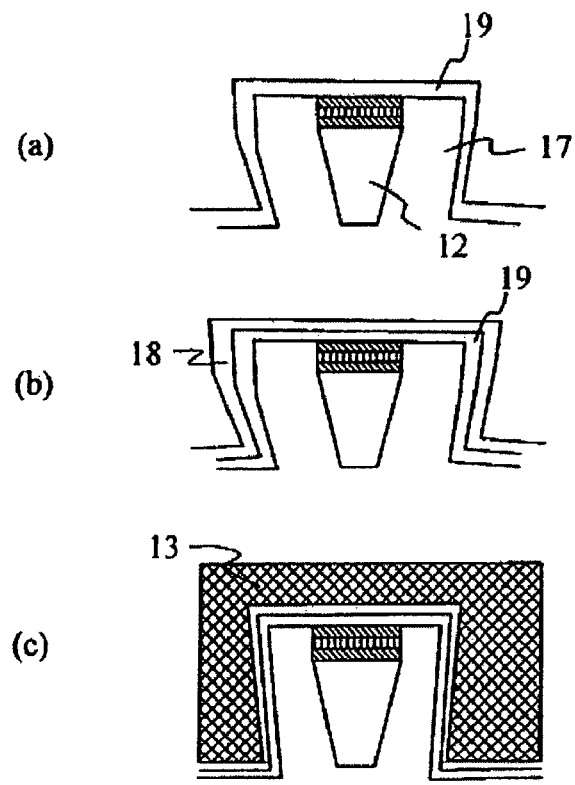
FIG. 5 is a schematic cross-sectional view showing another embodiment of a method of manufacturing the magnetic head according to the present invention.

FIG. 5 is a schematic cross-sectional view showing another embodiment of a method of manufacturing a magnetic head having a trailing side shield according to an embodiment of the present invention. Here, only the processes different from those shown in FIG. 3 will be described. The process shown in FIG. 5(a) is a process following FIG. 3(e).

Figure 6:
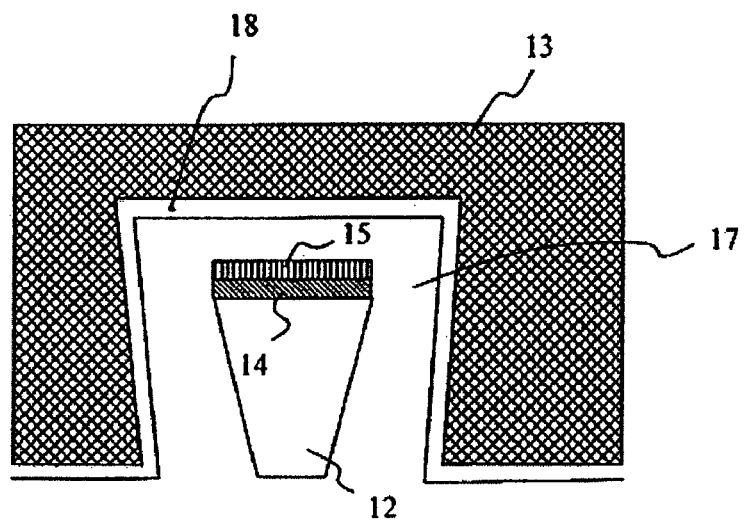
FIG. 6 is a schematic view of an air bearing surface shape showing a recording head according to an embodiment of the present invention.

According to this embodiment, as shown by FIG. 3(e), the nonmagnetic gap layer 17 is ion milled by detecting a signal from the etching signal layer 16. Next, as shown in FIG. 5(a), a new nonmagnetic gap layer 19 is formed. Next, as shown in FIG. 5(b), the plating seed layer 18 is formed thereupon, and as shown in FIG. 5(c), the trailing side shield 13 is formed by the plating with photoresist frame using the plating seed layer 18. The material of the plating seed layer 18 and the material of the treading side shield 13 are identical to those of the embodiment shown in FIG. 3, so their description will not be repeated. In the process prior to FIG. 5(a), the etching signal layer 16 may be removed as shown in FIG. 4(a). The air bearing surface state of the recording head when the etching signal layer 16 is removed, is as shown in FIG. 6.

Figure 7:
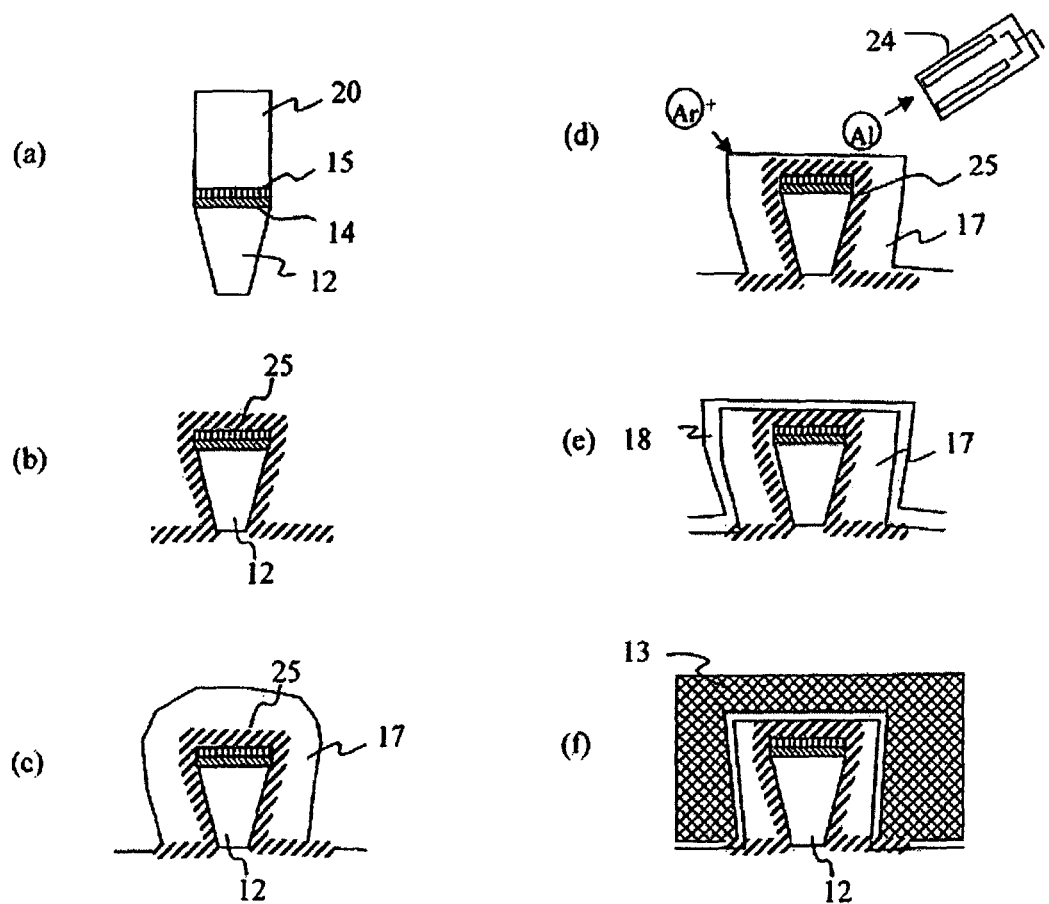
FIG. 7 is a schematic cross-sectional view showing a method of manufacturing the magnetic head according to an embodiment of the present invention.

FIG. 7 is a schematic cross-sectional view showing another method of manufacturing a magnetic head having a trailing side shield according to an embodiment of the present invention. Here, FIG. 7(a) is a process diagram corresponding to FIG. 3(c). In this embodiment, the etching signal layer 25 is formed after processing the main pole. Therefore, in the stage shown in FIG. 7(a), the etching signal layer is not formed. As shown in FIG. 7(a), after processing the main pole shape, the photoresist mask is removed, and then as shown in FIG. 7(b), the etching signal layer 25 is formed over the surrounding whole of the main pole 12. Next, as shown in FIG. 7(c), part of the trailing gap and the nonmagnetic gap layer 17 which will become the side gap are formed above and on the sides of the main pole. Next, as shown in FIG. 7(d), the trailing side of the nonmagnetic gap layer 17 is planarized by etching by ion milling. End point detection of ion milling is performed by detecting a signal showing that the etching signal layer 25 was etched, using the detector 24.

Next, as shown in FIG. 7(e), the plating seed layer 18 is formed, and as shown in FIG. 7(f), the trailing side shield 13 is formed by the plating with photoresist frame using the plating seed layer 18. In this case, the etching signal layer 25 remains on the side surfaces of the main pole, but if the etching signal layer 25 is made of a nonmagnetic material, there is no problem. The material of the etching signal layer 25 in this embodiment may be Ta, Cr, NiCr or Mo.

According to this embodiment, a trailing gap length wherein the distance from the trailing edge of the magnetic layer to the trailing shield of the main pole (total film thickness of the nonmagnetic gap layer, nonmagnetic layer which will become the etching mask, etching signal layer and nonmagnetic plating seed layer) is 50 nm or less, can be formed with high reproducibility.

Figure 8:
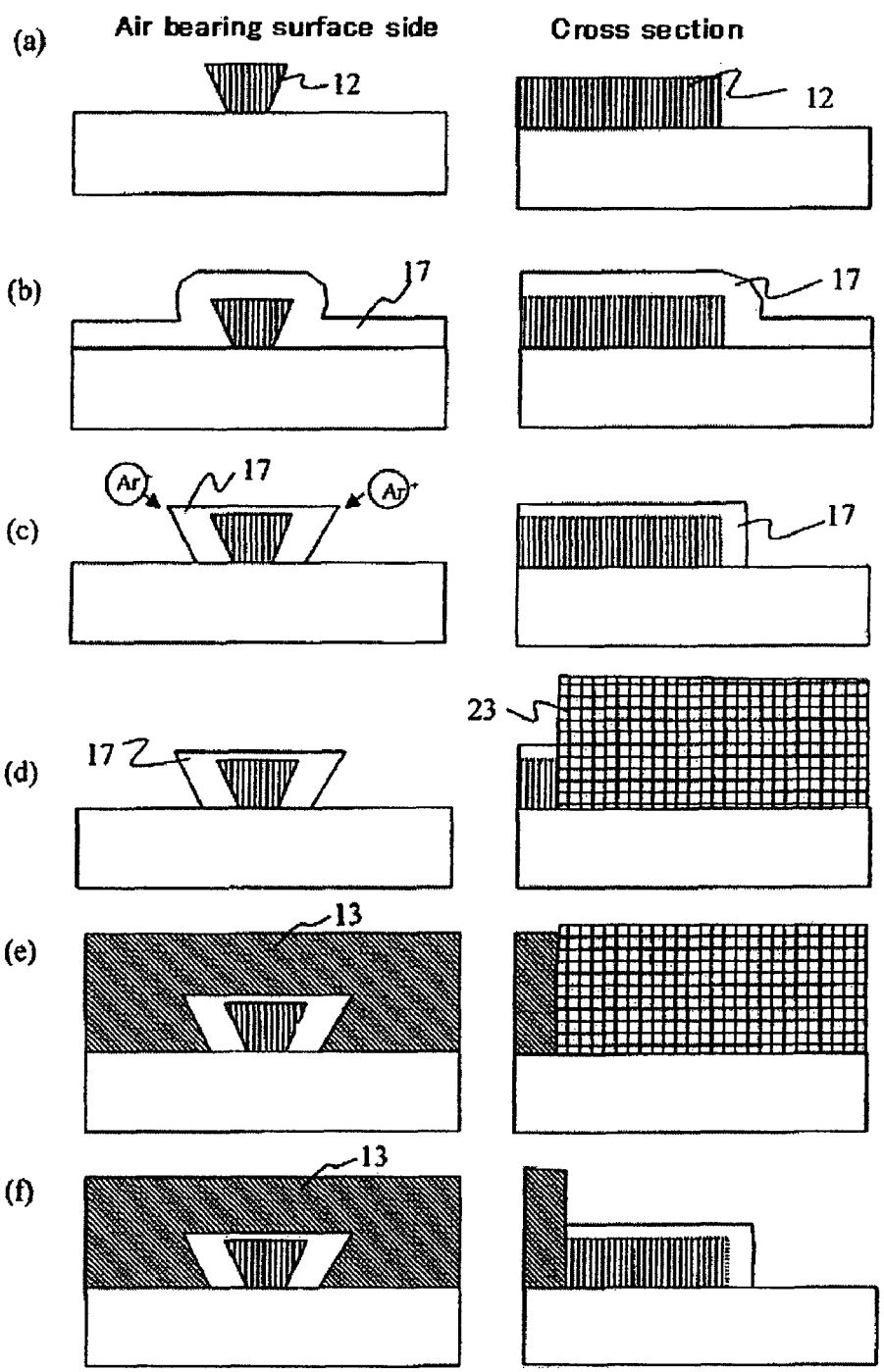
FIG. 8 is a schematic view of a trailing side shield-forming process.

FIG. 8 shows an overview of the trailing side shield forming process. The left-hand diagrams in each process are schematic cross-sectional views in a direction parallel to the air bearing surface, and the right-hand diagrams are cross-sectional views in the direction perpendicular to the air bearing surface. FIG. 8(a) shows the formation of the main pole having an inverted trapezoidal shape. FIG. 8(b) shows another embodiment wherein the nonmagnetic gap layer 17 is formed thereupon. FIG. 8(c) shows the stage where the nonmagnetic gap layer 17 has been etched by ion milling. The incident angle of ion milling is approximately 45° to approximately 65°. End point detection of this ion milling is performed using an etching signal layer formed above the main pole. FIG. 8(d) shows the state after forming the plating seed layer, and forming the photoresist frame pattern 23. If the plating seed layer is Au, since the reflectivity with respect to the KrF excimer laser is low, the effect of halation does not appear in the frame shape. If there is halation, a constriction appears in the side surface shape of the resist shown in the schematic cross-sectional view on the right-hand side. FIG. 8(e) shows the state where the magnetic layer which will become the trailing side shield has been plated using the plating seed layer and photoresist frame. FIG. 8(f) shows the stage where the photoresist frame and plating seed layer are removed, and the trailing side shield is formed around the main pole.

Figure 9:
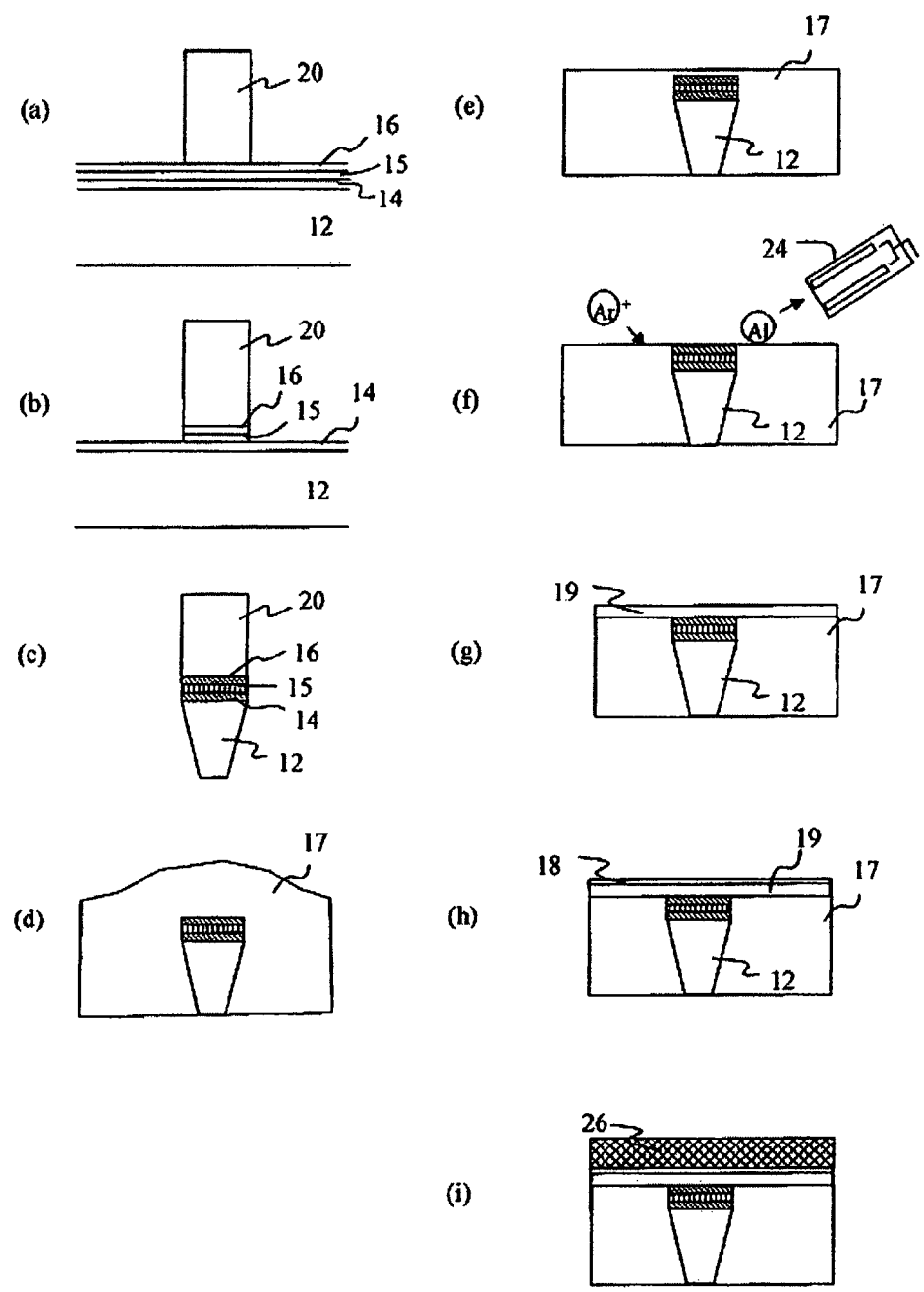
FIG. 9 is a schematic cross-sectional view showing a method of manufacturing a magnetic head according to an embodiment of the present invention.

Next, a method of manufacturing a magnetic head having a trailing shield according to an embodiment of the present invention will be described using the schematic cross-sectional view of FIG. 9. Here, the process for manufacturing the main pole of the recording head, and the trailing shield disposed on the trailing side of the main pole, will be described.

As shown in FIG. 9(a), the nonmagnetic gap layer 14, nonmagnetic etching mask layer 15, etching signal layer 16 and resist 20 are sequentially deposited on the magnetic layer 12 which will become the main pole, and the resist 20 is patterned according to the shape of the main pole. A material such as FeCo having a high saturation flux density Bs is used for the magnetic layer of the main pole. The nonmagnetic layer 14 is a layer for avoiding damage such as oxidation of the upper surface (trailing edge surface) of the main pole during the wafer process, and the reason why the nonmagnetic gap layer 14 is required is because, during perpendicular magnetic recording, the trailing edge of the main pole (upper surface of the main pole in the wafer process) has an important function in recording on the medium. Examples of a gap material which may be used are Cr, NiCr, Ta, Rh, Mo, Nb and Au. The nonmagnetic etching mask layer 15 formed on the gap layer may be omitted by increasing the film thickness of the nonmagnetic gap layer 14. Examples of the nonmagnetic etching mask layer 15 which may be used are single layer films or laminated films of alumina, silica, titanium, titania, tantalum and tantalum oxide.

The etching signal layer 16 must be of a different material from that of the nonmagnetic gap layer 17 formed thereupon in the process (d) in FIG. 9 described later. For example, if alumina is used for the nonmagnetic gap layer, the material of the etching signal layer 16 to be used may be silicon, silica, tantalum, tantalum oxide, titanium, titania, NiCr, Cr, Rh, Mo, Nb or Au. Considering the ion milling rate, the etching single layer 16 preferably has a close ion milling rate to that of the nonmagnetic gap layer 17. For example, if alumina is used for the nonmagnetic gap layer, tantalum may be used as another material with a slow ion milling rate.

Next, as shown in FIG. 9(b), the resist 20 is etched up to the etching signal layer 16 and nonmagnetic etching mask layer 15 by ion milling of the mask. Next, as shown in FIG. 9(c), the nonmagnetic gap layer 14 and magnetic layer 12 of the main pole are etched using the resist mask 20, etching signal layer 16 and nonmagnetic etching mask layer 15 as a mask, and the main pole is processed to an inverted trapezoidal shape.

Next, the resist mask 20 is removed, and as shown in FIG. 9(d), the nonmagnetic gap layer 17 is formed on the top and sides of the main pole. Examples of the material of the nonmagnetic gap layer are oxides such as alumina and silica, nitrides such as alumina nitride and silicon nitride, and nonmagnetic metals such as Cr, Ta, NiCr, Au and Cu. For deposition, a bias sputtering machine, ion beam deposition machine or chemical vapor deposition (CVD) machine is preferably used.

Next, as shown in FIG. 9(e), polishing is performed up to the main pole and above the etching signal layer 16 by chemical mechanical polishing (CMP). The distance from the etching signal layer 16 to the polished surface is in the range of approximately 0.1 μm to approximately 0.3 μm. Next, as shown in FIG. 9(f), milling is performed by ion milling until a signal from the etching signal layer 16 is detected. The incident angle of ion milling is preferably approximately 45° to approximately 65°. Next, as shown in FIG. 9(g), the nonmagnetic gap layer 19 is formed, and after forming the plating seed layer 18 as shown in FIG. 9(h), as shown in FIG. 9(i), the trailing shield 26 is formed by the plating with photoresist frame. The plating seed layer may be for example Au/Cr, Au/Ta, Au/NiCr, NiFeCo, CoFe, NiFe, CoNiFe, Ir, Rh, Re, Pt or Pd.

In the method disclosed in accordance with embodiments of the present invention, due to the presence of the nonmagnetic gap layer on the trailing side of the magnetic layer of the main pole and the nonmagnetic layer which will become the etching mask, the upper surface of the main pole is not subject to damage. Also, since the etching signal layer is provided and the etching end point is detected, the gap interval on the trailing side may be controlled to high accuracy.

According to this embodiment, a trailing gap length in which the distance from the trailing edge of the magnetic layer to the trailing shield of the main pole (total film thickness of the nonmagnetic gap layer, nonmagnetic layer which will become the etching mask, etching signal layer and nonmagnetic plating seed layer) is 50 nm or less, can be formed with high reproducibility.

Figure 10:
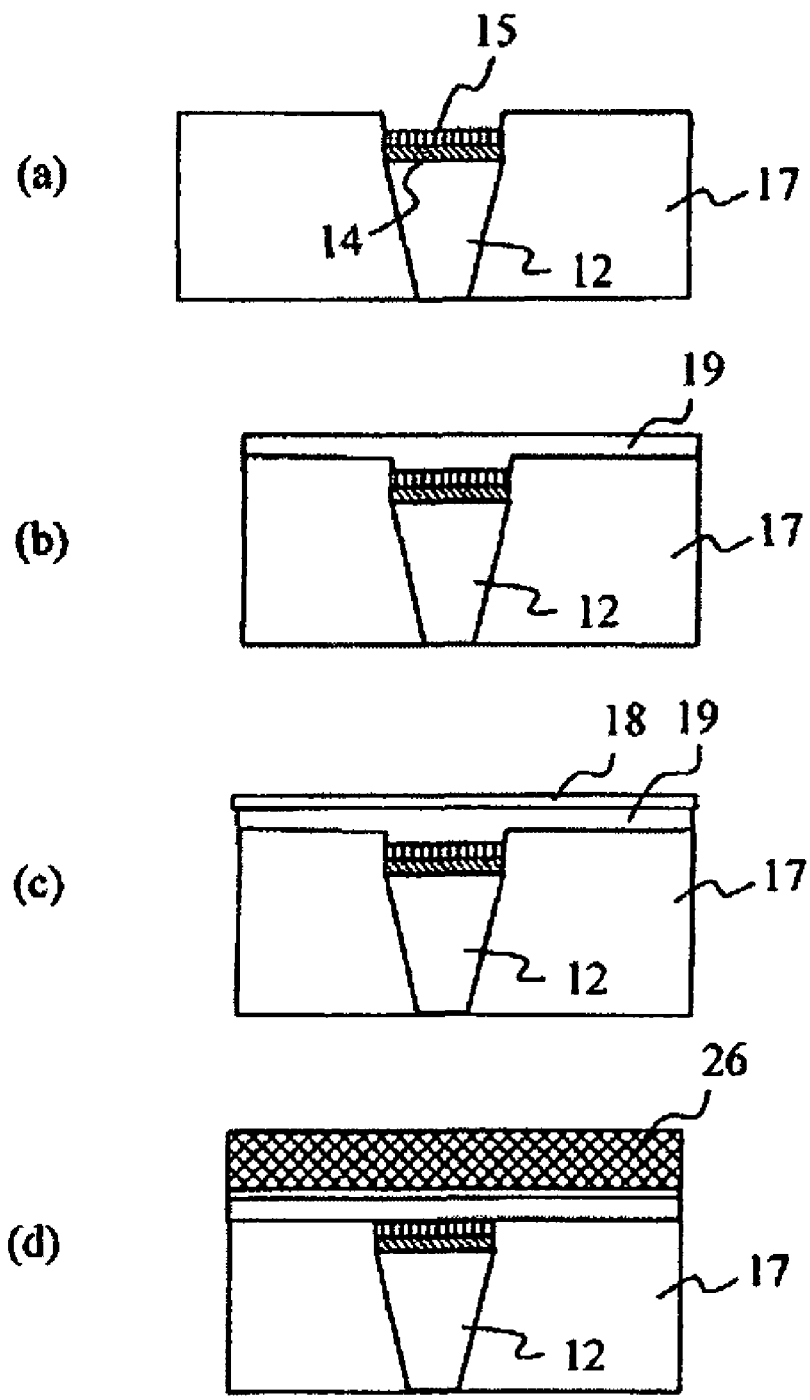
FIG. 10 is a schematic cross-sectional view showing a method of manufacturing a magnetic head according to another embodiment of the present invention.
Figure 1:
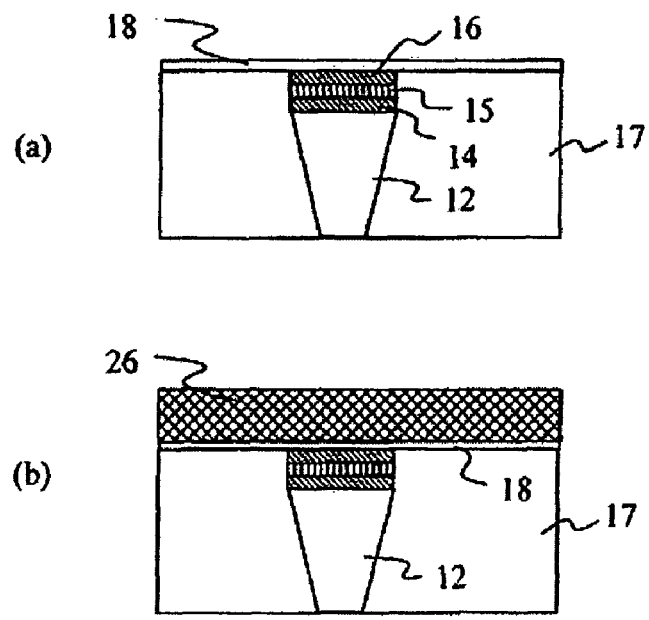
Figure 1:
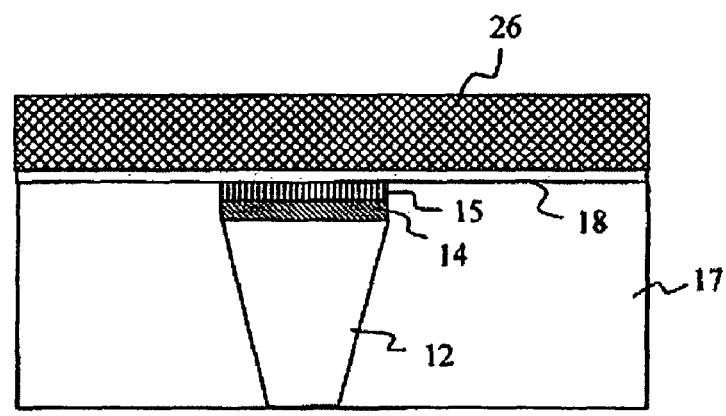

FIG. 10 shows a cross-sectional view of another embodiment of the magnetic head manufacturing method having a trailing shield according to an embodiment of the present invention. Here, only the processes different from those shown in FIG. 9 will be described. The process shown in FIG. 10(a) is a process following FIG. 9(f).

In this embodiment, as described using FIG. 9(f), the nonmagnetic gap layer 17 is ion milled until a signal from the etching signal layer 16 is detected. After that, as shown in FIG. 10(a), only the etching signal layer 16 is removed by reactive ion etching (RIE). For example, when the etching signal layer 16 is Si, $SiO_2$, Ta, or $Ta_2O5$, RIE with $CF_4$ or $CHF_3$ may be used. If the nonmagnetic gap layer 17 is alumina, a selectivity ratio of 1000 or more is obtained. Following this, as shown in FIG. 10(b), the nonmagnetic gap layer 19 is formed, as shown in FIG. 10(c), the plating seed layer 18 is formed, and as shown in FIG. 10(d), the trailing shield 26 is formed by plating with photoresist frame. In this case, the trailing gap length does not include the etching signal layer, so a trailing gap length of 20 nm or less can be demarcated with high accuracy.

FIG. 11 shows a cross-sectional view of another method of manufacturing a magnetic head having a trailing side shield according to an embodiment of the present invention. The process shown in FIG. 11(a) is a process following FIG. 9(f).

In this embodiment, as was described using FIG. 9(f), the nonmagnetic gap layer is ion milled until a signal from the etching signal layer 16 is detected. Next, without forming a nonmagnetic gap layer, as shown in FIG. 11(a), the plating seed layer 18 is formed, and as shown in FIG. 11(b), the trailing shield 26 is formed by the plating with photoresist frame. In the process prior to FIG. 11(a), as shown in FIG. 10(a), the etching signal layer 16 may be removed. The air bearing surface shape of the recording head when the etching signal layer 16 has been removed, is shown in FIG. 12.

Figure 13:
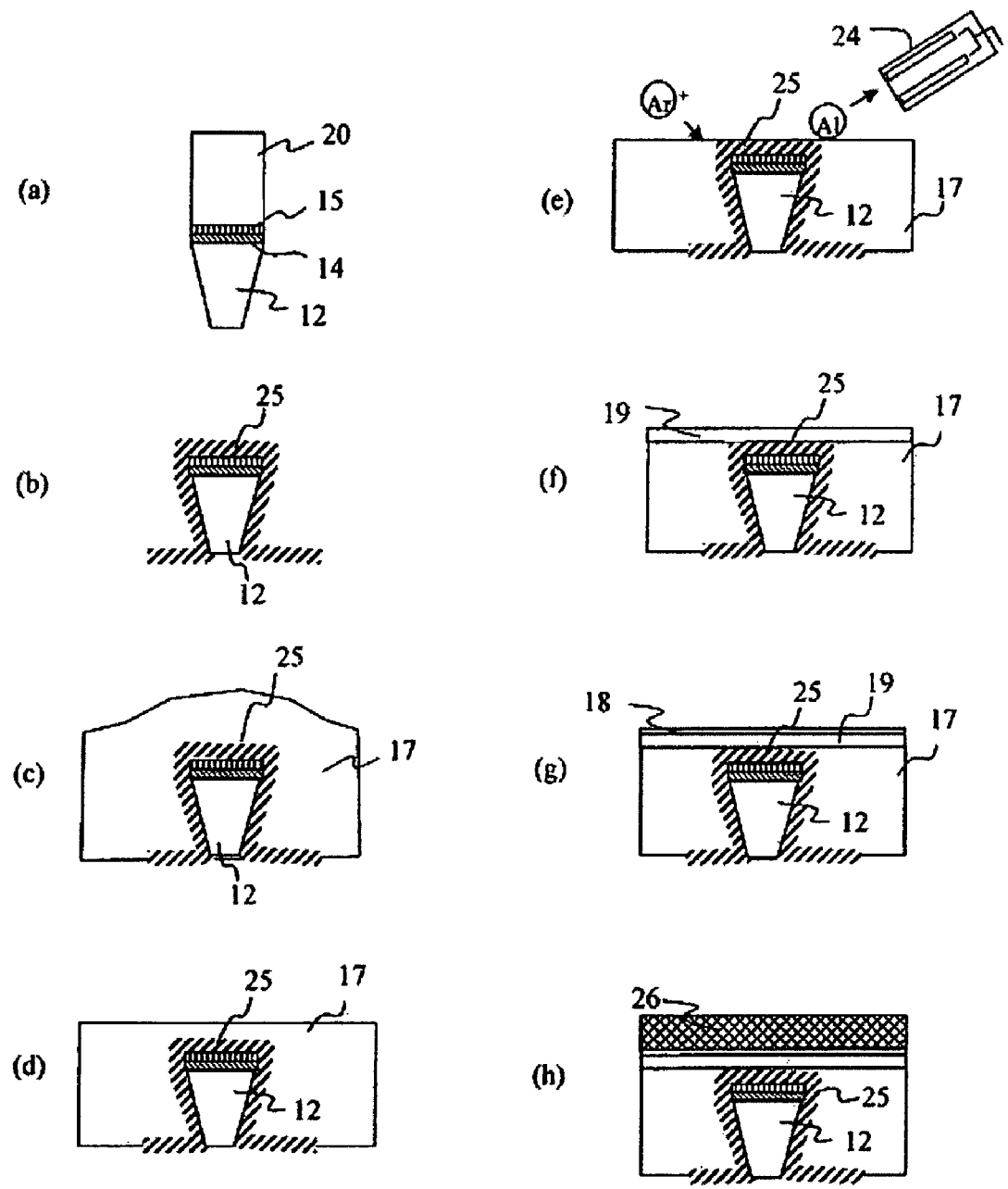
FIG. 13 is a schematic cross-sectional view showing a method of manufacturing the magnetic head according to an embodiment of the present invention.

FIG. 13 is a schematic cross-sectional view showing another method of manufacturing the head having the trailing shield according to an embodiment of the present invention. Here, FIG. 13(a) is a process diagram corresponding to FIG. 9(c). In this embodiment, the etching signal layer 25 is formed after processing the main pole. Therefore, in the step shown in FIG. 13(a), the etching signal layer is not formed. As shown in FIG. 13(a), after processing the main pole shape, the resist mask 20 is removed, and then as shown in FIG. 13(b), the etching signal layer 25 is formed over the whole of the main pole 12. Next, as shown in FIG. 13(c), part of the trailing gap and the nonmagnetic gap layer 17 which will become the side gap are formed on the top and sides of the main pole.

Next, as shown in FIG. 9(e), polishing is performed up to the main pole and above the etching signal layer 16 by chemical mechanical polishing (CMP). The distance from the etching signal layer 16 to the polishing surface is in the range of approximately 0.1 µm to approximately 0.3 µm. Next, as shown in FIG. 9(f), milling is performed by ion milling until a signal from the etching signal layer 16 is detected. The incident angle of ion milling is preferably approximately 45° to approximately 65°. Next, as shown in FIG. 9(g), the nonmagnetic gap layer 19 is formed, and after forming the plating seed layer 18 as shown in FIG. 9(h), as shown in FIG. 9(i), the trailing shield 26 is formed by the plating with photoresist frame. The plating seed layer to be used may be for example Au/Cr, Au/Fa, Au/NiCr, NiFeCo, CoFe, NiFe, CoNiFe, Ir, Rh, Re, Pt or Pd.

FIG. 14 to FIG. 17 are diagrams showing an air bearing surface shape and cross-sectional shape of the perpendicular magnetic recording head according to an embodiment of the present invention. All of these diagrams show the case of a perpendicular magnetic recording head when the trailing side shield 13 is formed in the vicinity of the main pole, but the situation is identical when the trailing shield is formed in the vicinity of the main pole.

Figure 14:
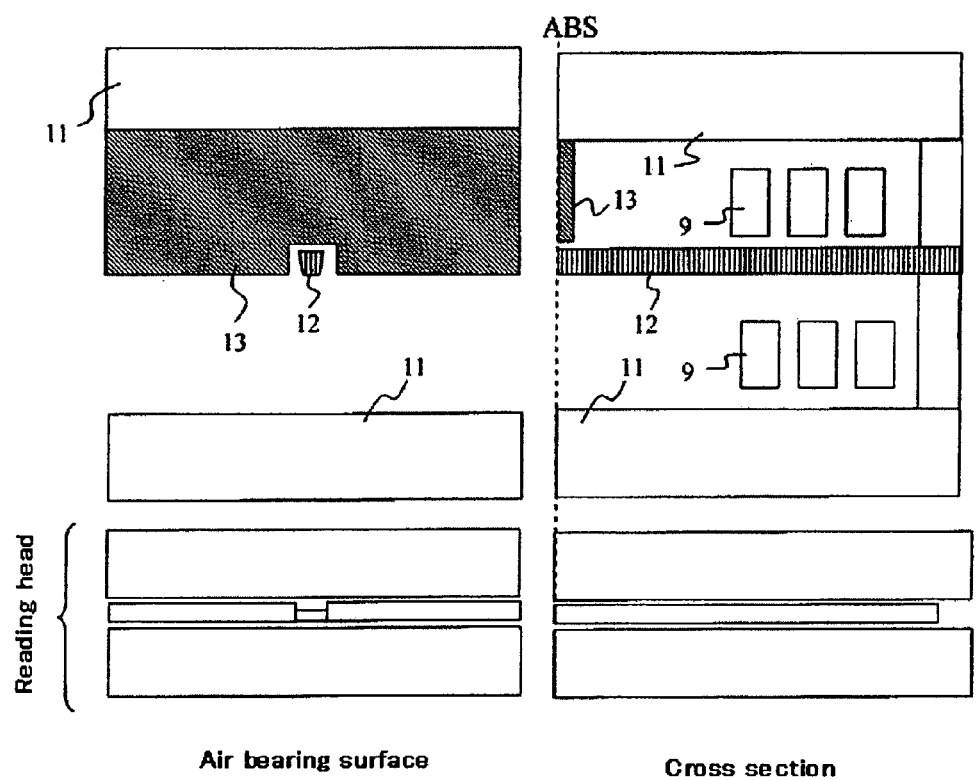
FIG. 14 is a diagram showing an example of an air bearing surface shape and cross-sectional shape of a perpendicular magnetic recording head according to an embodiment of the present invention.
Figure 15:
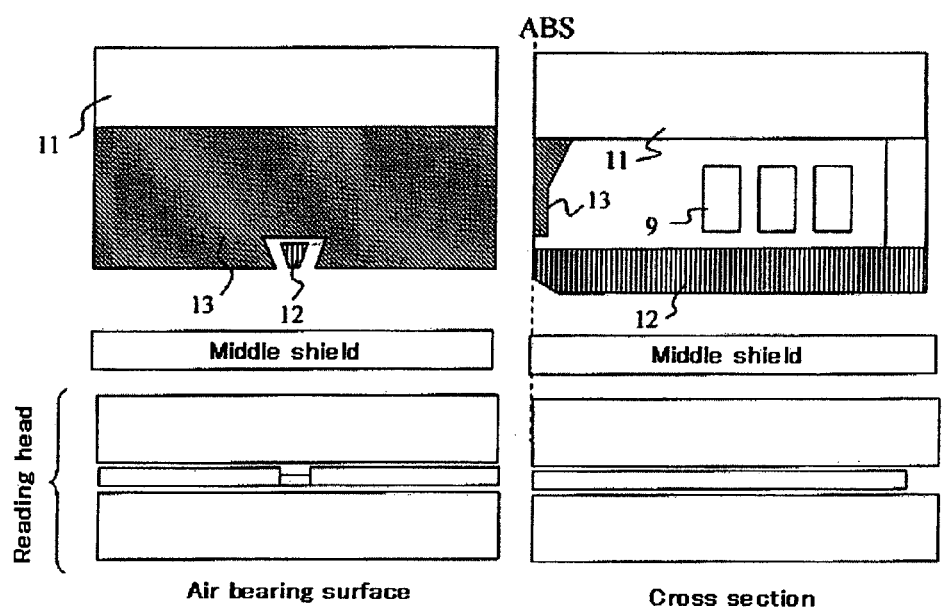
FIG. 15 is a diagram showing an example of an air bearing surface shape and cross-sectional shape of a perpendicular magnetic recording head according to an embodiment of the present invention.
Figure 16:
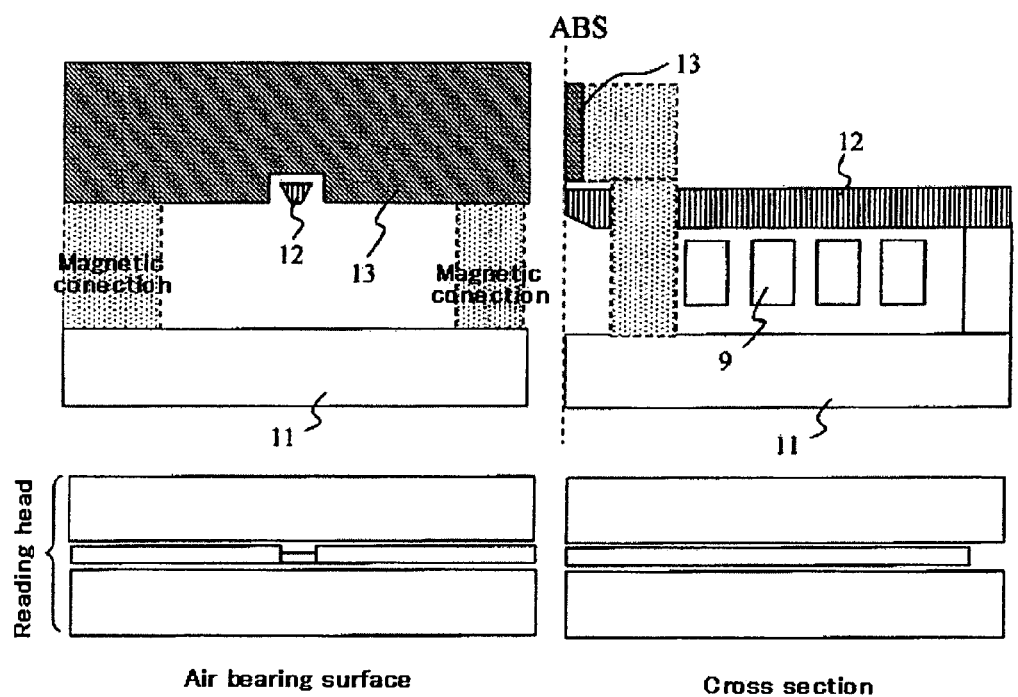
FIG. 16 is a diagram showing an example of an air bearing surface shape and cross-sectional shape of a perpendicular magnetic recording head according to an embodiment of the present invention.
Figure 17:
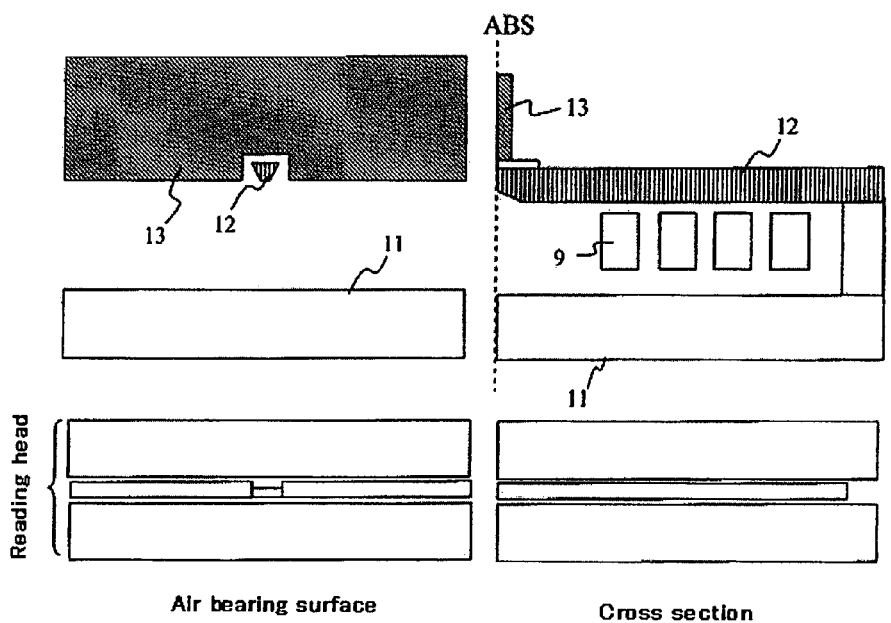
FIG. 17 is a diagram showing an example of an air bearing surface shape and cross-sectional shape of a perpendicular magnetic recording head according to an embodiment of the present invention.

FIG. 14 shows an example of a magnetic head wherein two upper and lower coils of the main pole 12 are provided. The coil shape may be two layers of a spiral coil as in the prior art, or a helical coil may be wound around the main pole 12. FIG. 15 shows the case where there is one coil, and a middle shield is provided between the main pole 12 and reading head. The magnetic field from the main pole 12 enters the read head, and the middle shield has the function of preventing the output of the read head from fluctuating. FIG. 16 shows the case of a magnetic head where there is the return pole 11 in the vicinity of the read head, and the trailing side shield 13 above the main pole 12 is magnetically connected to the return pole 11 by a connection pole. In this case, the connection pole is preferably connected with as low a magnetic resistance as possible. The case of FIG. 17 shows the case where there is no connection pole in an identical shape to that of FIG. 16, which is the most easily produced shape.

Figure 18:
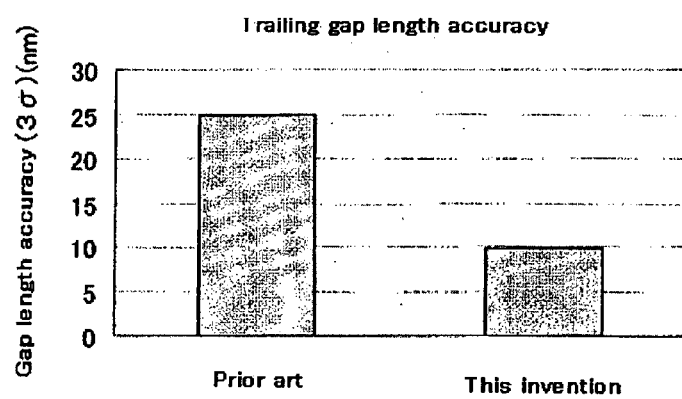
FIG. 18 is a graph comparing a trailing gap accuracy of a magnetic head.

FIG. 18 is a graph which compares the measured value 3 σ (nm) of the trailing gap length of a recording head manufactured by a prior art manufacturing method, and a write head manufactured by the method of an embodiment of the present invention. The trailing gap length so formed is approximately 40 nm. As seen from the diagram, in the prior art method, there is a large dispersion in the trailing gap length; however, when the invention is used, dispersion of the trailing gap length is reduced to half (½.5) or less. Hence, according to an embodiment of the invention, the trailing gap accuracy can greatly be improved.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A method of manufacturing a perpendicular magnetic recording having a main pole, return pole and trailing side shield disposed on a trailing side and the cross track direction side of said main pole, said method comprising:
   a process for forming a main pole having an etching signal layer in an upper part;
   a process for covering the top and sides of the main pole having said etching signal layer in the upper part with a nonmagnetic gap layer leaving open a region forming the side shield;
   a process for etching said nonmagnetic gap layer until a signal from said etching signal layer is detected by an etching signal detector; and a process for forming the trailing side shield on the top and sides of said nonmagnetic gap layer after etching.

2. The method of manufacturing the perpendicular magnetic recording head according to claim 1, wherein said process for forming the main pole having said etching single layer in the upper part further comprises:
- a process for forming the etching signal layer above a magnetic layer which will become the main pole; and
- a process for forming the main pole by processing the magnetic layer having said etching signal layer in the upper part.

3. The method of manufacturing the perpendicular magnetic recording head according to claim 1, wherein said process for forming the main pole having said etching signal layer in the upper part further comprises:
- a process for forming the main pole by processing the magnetic layer which will become the main pole; and
- a process for forming said etching signal layer above said main pole.

4. The method of manufacturing the perpendicular magnetic recording head according to claim 1, wherein said etching signal detector is a mass analyzer which detects ions from said etching signal layer.

5. The method of manufacturing the perpendicular magnetic recording head according to claim 1, wherein said etching signal detector is a device which detects light emitted due to said etching signal layer.

6. The method of manufacturing the perpendicular magnetic recording head according to claim 1, wherein said etching signal layer is removed before forming said trailing side shield.

7. The method of manufacturing the perpendicular magnetic recording head according to claim 1, wherein the etching of said magnetic gap layer is performed by ion milling.

8. The method of manufacturing the perpendicular magnetic recording head according to claim 7, wherein an incident angle of said ion milling is from 45° to 65°.

9. The method of manufacturing the perpendicular magnetic recording head according to claim 1, wherein said etching signal layer is a nonmagnetic layer containing Ta, Cr, Mo, W, Nb, Rh or Si.

10. The method of manufacturing the perpendicular magnetic recording head according to claim 1, wherein said nonmagnetic gap layer comprises alumina.

* * * * *